May 8, 1934.   F. L. HAUSHALTER   1,958,141
METHOD OF MAKING A FLEXIBLE CONNECTION
Original Filed Sept. 23, 1931
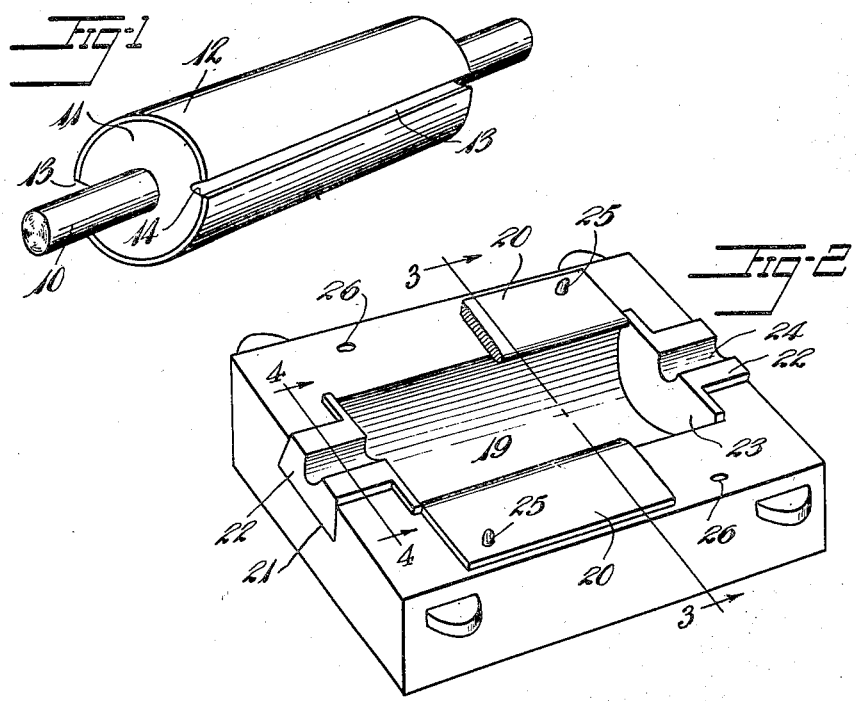
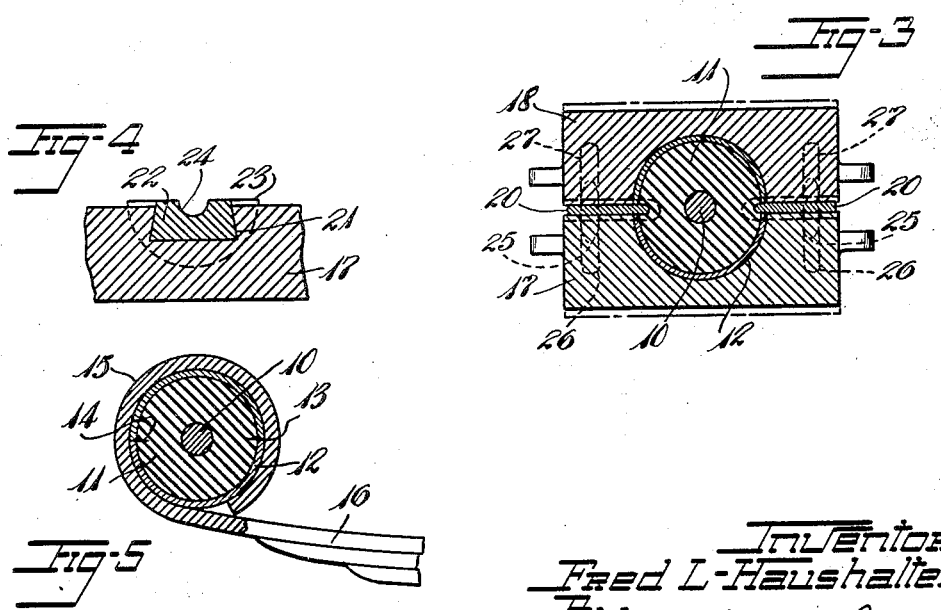
Inventor
Fred L. Haushalter
By Eakin & Avery
Attys.

Patented May 8, 1934

1,958,141

UNITED STATES PATENT OFFICE 1,958,141

METHOD OF MAKING A FLEXIBLE CONNECTION

Fred L. Haushalter, Akron, Ohio, assignor to The B. F. Goodrich Company, New York, N. Y., a corporation of New York Original application September 23, 1931, Serial No. 564,500. Divided and this application January 3, 1933, Serial No. 649,776

9 Claims. (Cl. 29—84)

This invention relates to the manufacture of flexible connections, especially torsion bearings in which the torsionally resistant element comprises a body of vulcanized rubber or similar resilient material secured between rigid members. This is a division of my application Serial No. 564,500, filed September 23, 1931.

The principal objects of the invention are to provide a bearing in which the torsional resistance may be predetermined, to provide a method by which such a structure may be readily produced, and to provide a method by which bearings having different resistances to torsion may be produced by means of a single apparatus.

Other objects will appear from the following description.

In the drawing, Fig. 1 is a perspective view of the bearing and its shaft before being subjected to stress.

Fig. 2 is a perspective view of a mold-half used in making the bearing, parts being broken away to show the construction more clearly.

Fig. 3 is a vertical cross-sectional view of the complete mold with a finished bearing and shaft therein, taken on line 3—3 of Fig. 2.

Fig. 4 is a vertical cross-sectional view on line 4—4 of Fig. 2, showing only the lower mold half.

Fig. 5 is an elevation, partly in cross-section, showing the torsional bearing as applied to a leaf spring, part of the spring being broken away.

Referring to the drawing, the numeral 10 designates a shaft of rigid material, preferably metal, the numeral 11 designates a body of resilient material such as vulcanized rubber surrounding the shaft and preferably bonded thereto as by vulcanization, and the numeral 12 designates a rigid member surrounding substantially one half of the resilient member, there being two such rigid members 12 spaced from each other as at 13. The members 12 are preferably vulcanized or otherwise bonded to the resilient member. The resilient member 11 is formed by molding a plastic compound to fill the space between the members 12 and the shaft 10 when the members 12 are spaced equally distant from the shaft by an amount greater than will obtain when the device is in use and substantial grooves 14 are formed in the resilient member communicating with the spaces 13 between the rigid shell members.

When the device is placed in operative position the shells 12 are forced toward each other, preferably until their margins defining the spaces 13 are in contact as seen in Fig. 5, whereby the resilient member 11 is placed under a predetermined stress caused by flow of the resilient material and regulated by the space 13. In the movement of the shells 12 toward each other the grooves 14 provide space for the flow of the resilient material, which is only slightly compressible.

Means such as the eye 15 formed in the spring leaf 16 is provided for holding the shells 12 in proper relation. Where such means are rigid as shown in Fig. 5 the shells 12 may be forced toward each other by temporary clamping means and the device pressed into the permanent holding means. When the device is to be inserted in a separable pillow block or similar device the means, such as studs, ordinarily used for holding the cap of the pillow block may be used to force the shells 12 into proper relation.

Where a high degree of distortion of the rubber is provided for to hold the bushing in its mounting, the bonding of the rubber to the rigid member may be dispensed with, the friction of the rubber on the rigid surfaces being depended on to prevent slipping of the parts on each other. It is preferred to provide vulcanized adhesion of the rubber at least to the shaft member because of its comparatively small rubber-contacting area.

In the production of the device a mold comprising two main portions 17 and 18 having cavities 19 of the desired shape is provided. Removable groove-forming spacing strips 20 are provided to hold the shell members 12 in proper relation, to mold the grooves 14, and to regulate the spacing of the shell members with relation to the shaft. By providing sets of spacing strips 20 of different thicknesses, bearings adapted to be placed under different initial stresses may be produced from the same mold.

In order to close the space between the mold members 17 and 18 at the ends of the mold, said mold member 17 is formed with dove-tailed notches 21 and removable blocks 22, having corresponding dovetails and of sufficient height to bring their upper faces level with the spacers 20, are provided. These blocks have semi-circular flanges 23 which fit the mold cavity and serve to retain the blocks 22 against outward movement under molding pressure. They are also provided with cavities 24 to fit the shaft of the article to be molded.

The spacer plates 20 are provided with dowels 25 which engage with dowel holes 26 and 27 in the mold parts 17 and 18 to hold the parts in alignment.

In the manufacture of a torsional bearing according to the invention the desired initial stress to be placed on the resilient member is first determined and the desired spacing of the shell members 12 and the desired grooving of the resilient member 11 is determined therefrom. Spacing plates 20 and mold blocks 22 are then selected to give the desired spacing and groove conformation. The shell halves 12 are also placed in the mold when bonding of the resilient member thereto is desired. A quantity of the plastic material for forming the resilient member is assembled in the mold with the shaft to be molded therein and the mold is closed under pressure and vulcanization of the plastic accomplished by the application of heat.

After vulcanization the bearing is removed from the mold and after cooling from the temperature of vulcanization, during which the adhesion of the plastic material to the shaft and sleeve members is not weakened by the shrinkage of the material due to the fact that the sleeve members can yield toward the shaft, the bearing is ready for use. The resilient member is placed under initial stress in placing the bearing as hereinbefore described.

I claim:

1. The method of making a torsional bearing, said method comprising arranging a pair of bushing members in eccentric relation to a shaft, molding a vulcanizable plastic material therebetween to form a vulcanized torsion member, normally holding the bushing members in such relation, and placing the vulcanized torsion member so formed under compression by applying pressure to hold said bushing members in substantially concentric relation to said shaft.

2. The method of making a torsional bearing, said method comprising molding a vulcanizable plastic material between a shaft and a pair of separate and spaced apart bushing members surrounding the same to form a torsionally distortable vulcanized member, and thereafter distorting said vulcanized member by pressure applied radially to said bushing members.

3. The method of making a torsional bearing, said method comprising assembling between mold members a shaft, a pair of rigid bushing members, and a quantity of vulcanizable plastic material, introducing spacing members between said mold members to hold said bushing members farther away from the shaft than when in operative position in the completed device and to form clearance grooves in the plastic material, vulcanizing the plastic material while so confined, and so applying pressure to the bushing members as to move them to their operative positions and cause circumferential displacement of the vulcanized plastic material.

4. The method of making a torsional bearing having a rigid shaft, a torsionally distortable member surrounding a portion thereof and a pair of separate semicylindrical bushing members enclosing the distortable member, which method comprises molding the distortable member while supporting the bushing members in spaced relation, and thereafter so confining the bearing that the bushing members are forced toward the shaft to place the distortable member under an initial compression.

5. The method of making a torsional bearing which comprises molding an annulus of vulcanizable plastic material upon a shaft element in bonded adhesion therewith, said annulus being molded with an axially extending groove at its outer surface, and mounting the assembly within an enclosing structure with the body of plastic material held compressed between the outer structure and inner element.

6. A method as defined in claim 3 in which the plastic material is cooled from the heat of vulcanization with the said spacing members removed from the bushing members to permit the bushing members to yield toward each other during the shrinkage of the material.

7. The method of making a torsional bearing which comprises molding a body of vulcanizable plastic material upon an inner shaft element in bonded adhesion with the latter and forming a recess in the body in which the material is distortable, and then mounting the assembly within an enclosing structure with the body of plastic material held compressed between the outer structure and inner element.

8. The method of making a cushioned bearing which comprises molding an annular body of rubber within a plurality of separate and spaced apart enclosing members, and thereafter mounting said body and members within an enclosing structure with members moved inwardly toward each other and the rubber body thereby held compressed.

9. The method of making a cushioned bearing which comprises molding an annular body of rubber within a plurality of separate and spaced apart enclosing members in vulcanized adhesion therewith, and thereafter mounting said body and members within an enclosing structure with the members moved inwardly toward each other and the rubber body thereby held compressed.

FRED L. HAUSHALTER.